US011352173B2

(12) United States Patent
Murray

(10) Patent No.: US 11,352,173 B2
(45) Date of Patent: Jun. 7, 2022

(54) POUCH FOR TRANSPORTATION AND STORAGE OF NATURAL MATERIALS

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 916 days.

(21) Appl. No.: 14/864,216

(22) Filed: Sep. 24, 2015

(65) Prior Publication Data

US 2016/0090213 A1    Mar. 31, 2016

Related U.S. Application Data

(60) Provisional application No. 62/182,840, filed on Jun. 22, 2015, provisional application No. 62/055,044, filed on Sep. 25, 2014.

(51) Int. Cl.
| | |
|---|---|
| *B65D 33/00* | (2006.01) |
| *B65D 33/25* | (2006.01) |
| *B65D 33/04* | (2006.01) |
| *G06Q 30/00* | (2012.01) |
| *H04B 5/00* | (2006.01) |
| *B65D 27/08* | (2006.01) |
| *B65D 27/04* | (2006.01) |

(52) U.S. Cl.
CPC ......... *B65D 33/2508* (2013.01); *B65D 27/04* (2013.01); *B65D 27/08* (2013.01); *B65D 33/004* (2013.01); *B65D 33/04* (2013.01); *B65D 33/25* (2013.01); *G06Q 30/018* (2013.01); *H04B 5/0031* (2013.01)

(58) Field of Classification Search
CPC ...... B65D 33/004; B65D 33/04; B65D 33/25; B65D 33/2508; B65D 27/04; B65D 27/08; B65D 2203/02; B65D 2215/04; B65D 31/12; B65D 33/008; B65D 33/2566; B65D 33/2591; B65D 33/2516; B65D 33/255; B65D 33/2558; B65D 33/2575; B65D 33/2583; B65D 65/08; G06Q 30/018; H04B 5/0031; A45C 13/103; A45C 13/1023
USPC ....................... 206/216; 383/38–40, 61.3, 97
See application file for complete search history.

(56) References Cited

U.S. PATENT DOCUMENTS

| | | | |
|---|---|---|---|
| 4,744,673 A | 5/1988 | Nakamura | |
| 5,533,810 A * | 7/1996 | Jensen | B65D 27/04 229/301 |
| 2004/0140233 A1 | 7/2004 | Ajootian | |
| 2006/0027478 A1* | 2/2006 | Kaufman | B65D 33/004 206/459.5 |
| 2008/0240628 A1* | 10/2008 | VanLoocke | B65B 29/10 383/210 |

(Continued)

*Primary Examiner* — Andrew D Perreault
(74) *Attorney, Agent, or Firm* — Dinsmore & Shohl LLP

(57) ABSTRACT

A flexible pouch comprising a first panel and a second panel. A first compartment and a second compartment are formed between the first panel and the second panel. A seal positioned on the first and second panels between the first compartment and the second compartment. The first compartment includes at least one sidewall formed from the first panel and the second panel wherein the two sidewalls of the first compartment are opaque to as to prevent visibility of the contents of the first compartment. An NFC tag and/or a child proof zip seal or lock may also be provided.

7 Claims, 2 Drawing Sheets

(56) References Cited

U.S. PATENT DOCUMENTS

2011/0243482 A1* 10/2011 First .................... B65D 33/004
383/72
2014/0298757 A1 10/2014 Chapek
2014/0367295 A1* 12/2014 Murray ............... B65D 33/004
206/459.5

* cited by examiner

POUCH FOR TRANSPORTATION AND STORAGE OF NATURAL MATERIALS

CROSS-REFERENCE TO RELATED APPLICATIONS

This application depends from and claims priority to U.S. Provisional Application No. 62/055,044 filed on Sep. 25, 2014 and U.S. Provisional Application No. 62/182,840 filed on Jun. 22, 2015, both of which are incorporated herein by reference.

FIELD OF THE INVENTION

The present invention relates generally to a pouch. More specifically, the present invention related to container for packaging a product of natural materials.

BACKGROUND OF THE INVENTION

Certain natural materials are sold from bulk containers to consumers. These materials, such as tobacco, medical marijuana, and the like, are displayed in bulk containers. The goods are then placed in containers for transport and storage by the consumer. Various types of containers have been utilized such as plastic bags with a zipper or zip lock type closure at the top of the package. However, such containers are not satisfactory for use with many materials including medical marijuana.

SUMMARY OF THE INVENTION

A flexible pouch comprising a first panel and a second panel. A first compartment and a second compartment are formed between the first panel and the second panel. A seal positioned on the first and second panels between the first compartment and the second compartment. The first compartment includes at least one sidewall formed from the first panel and the second panel wherein the two sidewalls of the first compartment are opaque to as to prevent visibility of the contents of the first compartment.

In one embodiment, the first compartment and the second compartment are secured by a child proof lock. The child proof lock is connected to a zip seal, the zip seal being resealable where the zip seal permits access to both the first compartment and the second compartment.

In the present embodiment, the first compartment and the second compartment are resealable. In one embodiment, the first compartment is opaque and the second compartment is transparent to allow the user to view the contents contained within the second compartment.

An NFC tag is connected to the pouch. The NFC tag is adapted to store readable information relating to the origination of the contents of the pouch. In one embodiment, the NFC tag is affixed to the exterior of the pouch. Alternatively, the NFC tag in contained within wither the first compartment or the second compartment.

In an alternative embodiment, the flexible pouch includes a first compartment and a second compartment where a seal positioned between the first compartment and the second compartment. The first compartment being opaque to as to prevent visibility of the contents of the first compartment. In this embodiment, an NFC tag is connected to the flexible pouch, the NFC tag adapted to store readable information relating to the origination of the contents of the pouch.

DETAILED DESCRIPTION OF THE PREFERRED EMBODIMENTS

The present apparatus is a flexible pouch for use with storing and transporting medical marijuana. The flexible pouch is generally rectangular shaped having two compartments. One compartment is formed to hold marijuana, and the second compartment is formed to hold a card having information about the dispensary and contents. The pouch is formed of two strips of laminate material. One strip is a top panel formed of laminate having a layer of ethylene vinyl alcohol. The other strip is a bottom panel which may be formed of the same material or be a laminate having a layer of aluminum.

Figure 1:
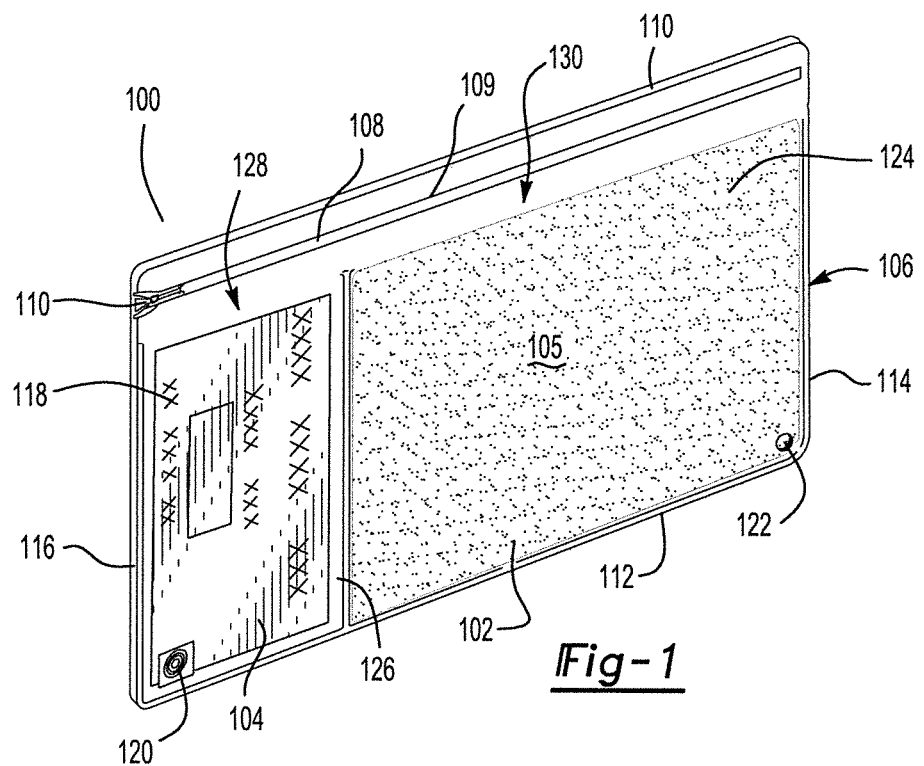
FIG. 1 illustrates a perspective view of the pouch.
Figure 2:
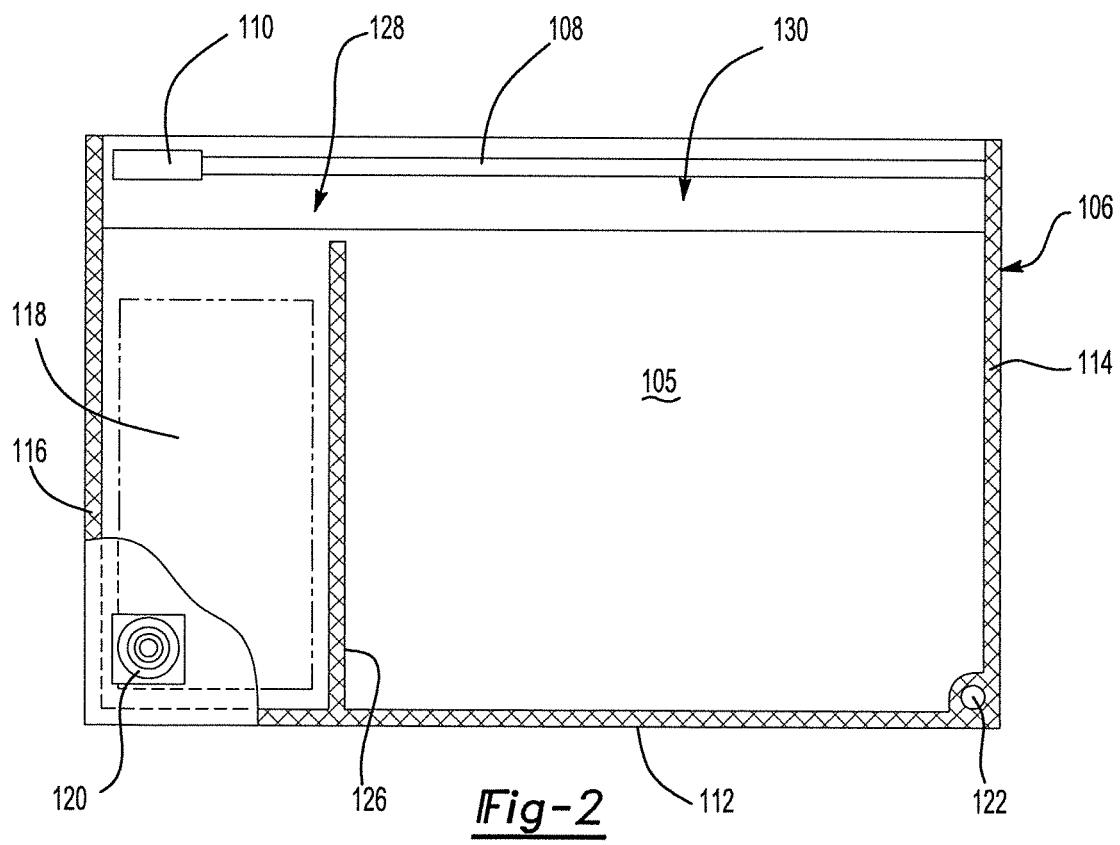
FIG. 2 illustrates a front view of the pouch as shown in FIG. 1.
Figure 3:
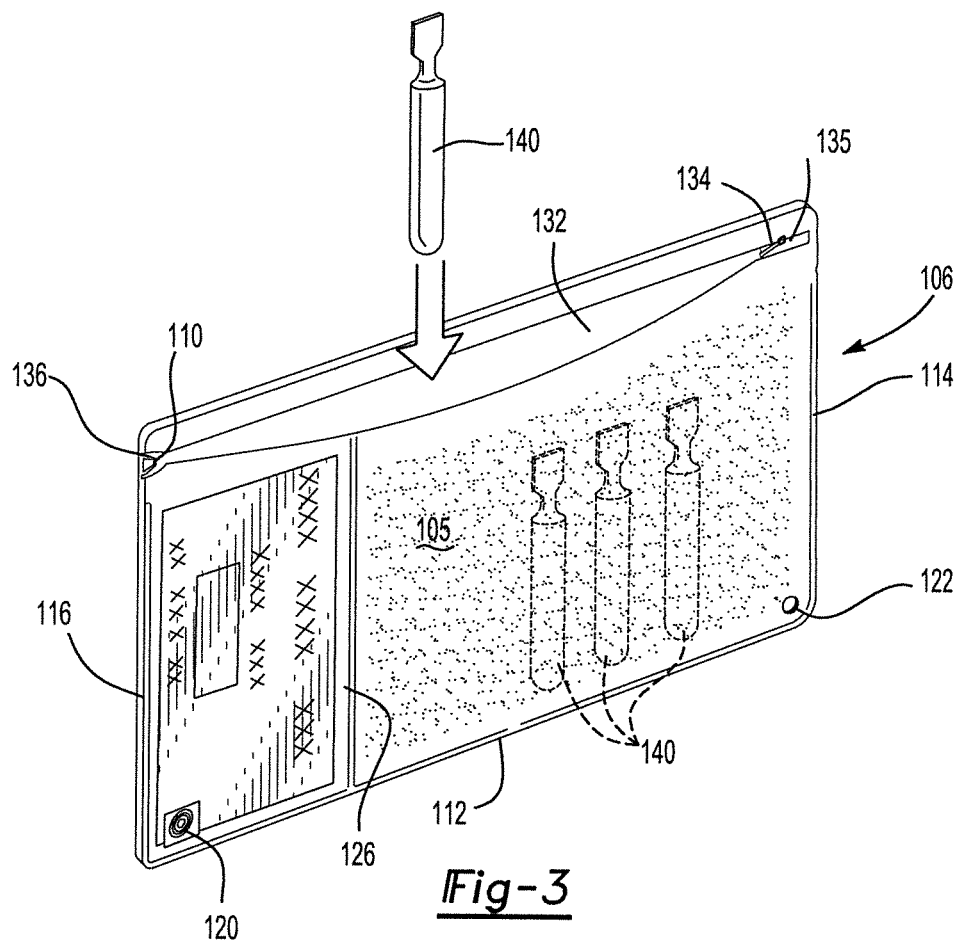
FIG. 3 illustrates an alternative embodiment of the pouch as illustrated in FIGS. 1-2 further including a plurality of vials containing oil.

FIGS. 1-3 illustrate a pouch 100 have two compartments: a first compartment 102 and a second compartment 104. In the first embodiment (such as shown in in FIGS. 1 and 2), the first compartment 102 is configured to hold medical marijuana and the second compartment 104 is configured to hold a business card 118. Alternatively, the second compartment 104 may hold rolling papers, advertisements, information about the product . . . etc.

The compartments 102, 104 are forms from two panels 105, 106. A first panel 105 is sealed to a second panel 106. In the present embodiment, the pouch is generally rectangular having a plurality of peripheral side seals 112, 114, 116. The seals 112, 114, 116 are preferably air and water tight so as to prevent air or liquid from entering the first compartment 102 or the second compartment 104.

The first and second compartments 104, 106 are generally rectangular pouches or envelopes configured to hold a product. In the present embodiment, the first and second compartments 102, 104 are sealed on all peripheral edges except an upper edge 108. The upper edge 108 of both the first compartment and the second compartments 102, 104 are sealed and secured by means of a child proof zip seal 109.

In the present embodiment, the zip seal 109 is enclosable and lockable. The zip seal include a locking mechanism 110 to prevent children from accessing the contents of the first compartment and the second compartment. The locking mechanism is slidable along the zip seal 109. The locking mechanism 110 includes a receiving portion 136 and a slidable portion 134. The slidable portion unlocks from the receiving portion 136 by actuating a lever 135 to release the slidable portion 134 from the receiving portion 136.

The first compartment 102 is separated from the second compartment 104 by means of a seal 126. The seal 126 acts as a barrier between the first compartment 102 and the second compartment 104. The seal 126 may be formed by heat seal and/or compression between the panels 105, 106.

The panels 105, 106 of the pouch described herein may be of a specific laminate such as described in the following. Specifically, the first panel and the second panel may be made of a laminate including three layers: an outer layer formed of PET having a thickness of approximately 12 microns, a center layer of aluminum having a thickness of approximately 9 microns, and an inner layer of S-LLDPE having a thickness of approximately 150 microns. This laminate provides a pouch which is airtight to preserve the longevity of the contents. The outer layer of PET is satisfactory for printing labeling information and warning information, the middle aluminum layer provides an airtight seal for the pouch, and the inner layer of S-LLDPE melts to form an adhesive for bonding the panels of the pouch together and to seal the fitment or closures in place. The aluminum also inherently dictates an opaque qualify for the panels.

In the present embodiment, an NFC tag 120 (near field code) is affixed to the pouch as shown in FIG. 1-3. The NFC tag 120 uses electromagnetic induction between two loop antennae when NFC devices to exchange information, operating within the globally available unlicensed radio frequency ISM band of 13.56 MHz on ISO/IEC 18000-3 air interface and at rates ranging from 106 kbit/s to 424 kbit/s. Each full NFC device can work in three modes: NFC Card Emulation; NFC Reader/Writer; and NFC peer-to-peer (P2P mode). NFC Card emulation mode enables NFC-enabled devices such as smartphones to act like smart cards, allowing users to perform transactions such as payment or ticketing. NFC Reader/writer mode enables NFC-enabled devices to read information stored on inexpensive NFC tags embedded in labels or smart posters. NFC peer-to-peer mode enables two NFC-enabled devices to communicate with each other to exchange information in an adhoc fashion. The present system utilized peer-to-peer mode to enable a user to read the information contained on the NFC tag 120.

The NFC tag 120 contains data (typically between 96 and 8,192 bytes of memory) and are read-only, but may be rewritable. Applications aside from the present system include secure personal data storage (e.g. debit or credit card information, loyalty program data, Personal Identification Numbers (PINs), contacts).

In the present embodiment, the NFC tag 120 is provided with a unique code prior to or at the time of the formation of the pouch. The NFC tag is provided to permit the dispensary to readily enter information into a database about the pouch by use of an NFC tag reader. The information about the pouch is then associated into the database with information in the database about the patient. The information may include the patient's identity, address, age, etc. Additionally, the prescription is entered into the database, then finally the quantity and date of the purchase is entered in. This information is associated with the pouch number so that law enforcement personnel may associate the pouch with the purchase information any time in the future.

The NCF tag 120 may be placed within the pouch, affixed to the interior of either the first or second compartments, affixed to the exterior of either the first or second compartments and/or sealed between the first and second panels 105, 106. Any adhesive or other known fastener may be used to connect the NFC tag 120 to the pouch 100.

In the present embodiment, the NFC tag 120 is positioned on the exterior of the second compartment 104. However, the NFC tag 120 may be positioned anywhere within or on the pouch 100.

The pouch is formed by first providing a strip of laminate having a width equal to the height of the pouch. A rectangular portion is severed from the strip of laminate and folded over itself (thereby forming the two panels 105, 106). When the two edges align, a seal bar then seals the two edges together. The pouch is then filled with medical marijuana 124, rolling papers, business cards . . . etc. The pouch 100 is then moved to the final station where the NFC chip is glued (or otherwise affixed such as discussed above) to the pouch.

If the pouch includes a metal wall (i.e. aluminum), it is necessary to put a layer of insulating material between the NFC tag and the outer panel to allow the NFC tag to be free of interference from the aluminum layer of the laminate.

The child-resistant sip seal 109 may be one such as one made by Presto Products is heat sealed to the top panel across a slit. The two strips are sealed on four sides, however a portion of the edge extending over the second compartment is not sealed to form an opening.

The seal 126 is spaced apart a distance from one of the side edges to form the second compartment to accept a card such as a dispensary card and an NFC tag. The seal 126 extends from the bottom seal towards the top but ends before the zipper. The portion of the front panel over the second compartment is clear to enable printing on the card to be read through the panels. A layer of opaque printing is placed on the front layer over the first larger compartment to prevent viewing of the contents of the first compartment. A hang hole 122 is formed in a corner of two of the seams.

After the pouch is formed the business card 118 or a dispensary card is inserted through the opening area into the second compartment 104. The product is inserted through the slider zipper into the first compartment 102.

The encoded NFC tag 120 is mounted to the pouch at the time of dispensing and filling the pouch. The NFC tag is activated by the dispensary and is provided with a code which is associated with customer details such as the prescription and customer identification information. This info nation is stored in a database. At a future time, the contents and identity of the possessor of the pouch can be verified by persons such as a law enforcement officer who has an NFC tag reader and an application which allows access to the database to view the customer information associated with the NFC code for that pouch. Thus is provided a two-compartment, three side seal pouch with a child-resistant slider zipper sealed onto the long side or top of the pouch.

FIG. 3 illustrates the same pouch of FIGS. 1 & 2 but further including a plurality of vials or bottles 140. The vials 140 are configured to hold THC, cannabis or marijuana oil. Certain states that allow the use of medical marijuana only permit use in oil form. By way of example, Georgia permits the use of low THC oil (less than 5% THC by weight) to treat various conditions. In those states requiring the use of only oil, a configurations such as shown in FIG. 3 will be used and sold. Similarly to the above, the first compartment 102 may be opaque to prevent visibility of the product contained therein. In the present embodiments such as shown in FIG. 3, all walls of the first compartment 102 are opaque. The other elements of the pouch 100, such as illustrated in FIG. 3, are the same as those enumerated above and as illustrated in FIGS. 1 and 2. The vials 140 may be one time use bottles or reclosable.

A method of tracking an NFC tag associated with a package of medical marijuana is further provided. The NFC tag can be any of the embodiments of the NFC tag 120, such as discussed above. The method includes the steps of providing a database with a listing of NFC tags, inputting data in connection with each of the NFC tags, the data relating to an individual, product content, the medical marijuana, dispensary and/or the location and connecting the database to a website whereby scanning of the NFC tag results in a user being directed to a website displaying the data associate with the package having the NFC tag. The method can be used in connection with any of the embodiments of the pouch as described above.

Thus is disclosed a pouch which may be used for tobacco and medical marijuana and other natural materials. Many variations of the pouch are within the scope and spirit of the invention.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. A flexible pouch comprising:
   a first panel and a second panel; and
   a first compartment and a second compartment formed between the first panel and the second panel, a barrier seal is positioned between the first and second panels, the barrier seal fixedly separates the first compartment from the second compartment, the first compartment having at least one sidewall formed from the first panel and the second panel along a peripheral edge, the first and the second panel of the first compartment being opaque to prevent visibility of contents within the first compartment, and wherein the first compartment and the second compartment are secured by a child proof lock.

2. The flexible pouch of claim 1 wherein the child proof lock is connected to a zip seal, the zip seal being resealable, the zip seal permitting access to both the first compartment and the second compartment.

3. The flexible pouch of claim 1 wherein the first compartment and the second compartment are resealable.

4. The flexible pouch of claim 1 wherein the first compartment is opaque and the second compartment is transparent to allow the user to view the contents contained within the second compartment.

5. The flexible pouch of claim 1 wherein an NFC tag is connected to the pouch, the NFC tag adapted to store readable information relating to the origination of the contents of the pouch.

6. The flexible pouch of claim 5 wherein the NFC tag is affixed to the exterior of the pouch.

7. The flexible pouch of claim 5 wherein the NFC tag in contained within either the first compartment or the second compartment.

* * * * *